Sept. 10, 1935.  J. T. MARVIN  2,013,732
CONNECTER
Filed June 10, 1933

John T. Marvin.
INVENTOR.

BY William F. Swezey
his ATTORNEY.

Patented Sept. 10, 1935

2,013,732

UNITED STATES PATENT OFFICE 2,013,732

CONNECTER

John T. Marvin, Cleveland, Ohio

Application June 10, 1933, Serial No. 675,224

1 Claim. (Cl. 285—166)

The present invention relates to couplings or connecters for pipe or tubing, and particularly to connecters in which the tubing is not provided with screw threads directly on its surface.

An object of the invention is to provide a coupling of the character described, which shall be fluid-tight when in its operating position.

Another object of the invention is to provide a coupling member which may be conveniently detached or separated without in any way injuring or deforming the tubing to which it is applied or the component parts of the connecter.

Other objects and advantages of the invention will be apparent in the following description and accompanying drawing in which.

Figure 1:
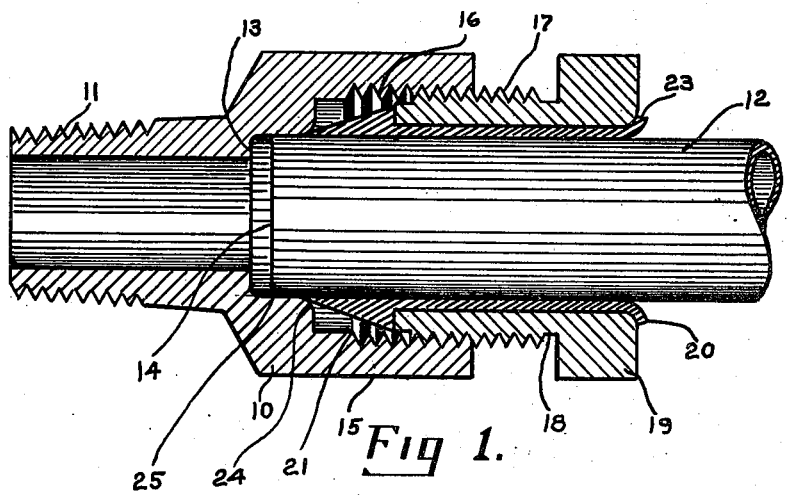
Fig. 1 is a view partly in section, showing my improved coupling member.
Figure 2:
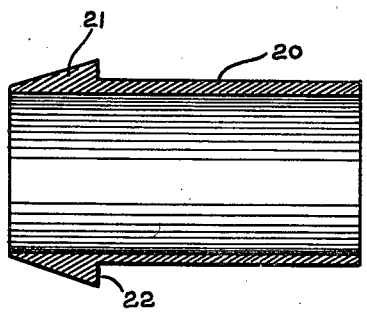
Fig. 2 is a sectional view of the ferrule forming a part of the coupling.

In carrying out the invention I provided a sleeve or coupler body 10 which is provided at its outer end with an external threaded portion 11 for cooperating with the body (not shown) with which the tubing 12 is to communicate. Inwardly the member 10 is provided with an angular seat 13 adjacent which the end 14 of the tubing 12 terminates. The enlarged end 15 of the member 10 is screw threaded internally, as indicated at 16 for receiving the screw threaded end 17 of a coupling member 18 which surrounds the tubing. The coupling member 18 is provided with a head 19 for receiving a wrench or other suitable means to permit its adjustment.

A ferrule 20, which may be made of relatively soft and flexible metal, extends longitudinally through the coupling member 18 and is provided at its inner end with a tapering triangular shaped portion 21, having a shoulder 22 which receives the inner end of the coupling member 18. The outer end of the ferrule after being inserted through the member 18 is swaged over as indicated at 23 to hold it in place. The member 18 and the ferrule 20 are rotatable relative to each other so that the coupling 18 may be turned without necessarily turning the ferrule. The coupling member 18 should be of a substantial length so as to provide a rigid support for the adjacent portion of the ferrule.

The body member 10 is provided internally thereof with a curved portion 24 and a straight portion 25, which is just slightly larger than the diameter of the tubing to be connected, and which straight portion extends from the curved portion 24 to the shoulder 13.

In assembling the coupling above described the coupling member 18 and its associated ferrule 20 are slid over the end of the tubing 12, after which the tubing is inserted in the body member 10 with its end resting against the shoulder 13 as indicated in Fig. 1. The coupling member 18 is then screwed into the body member 10, thereby tending to compress the wedge-shaped inner end of the ferrule between the curved portion 24 of the body member and the adjacent portion of the tubing. When the member 18 has been screwed to its extreme innermost position a fluid-tight joint is formed by reason of this wedging action. The uncoupling process is just the reverse of that described, and it will be apparent that after being uncoupled both the tubing and the coupling member 18 together with its associated ferrule may be re-used, inasmuch as no damage has been caused to any of the parts by reason of the original coupling or uncoupling.

It is apparent that I have provided a simple and effective coupling member or connecter which forms a gas-tight joint and which may be re-used as often as desired, and that while I have shown and described a specific embodiment of the invention, it is apparent that other forms might be adopted, all coming within the scope of the appended claim.

I claim:

In combination, a tube connecter comprising a body having a screw threaded bore therein and a counterbore extending axially from the inner end thereof whereby a shoulder is formed, a tube to be received in said counterbore, a coupling member exteriorly screw threaded for threaded engagement with the screw threads of the bore, and a ferrule rotatably mounted within the coupling member and closely embracing the tubing, said coupling member substantially throughout the length thereof closely embracing the ferrule, said ferrule having a wedge-shaped head on the inner end thereof, the apex of the wedge being adapted to inject between the body shoulder and the tube, said head having a shoulder adapted to be engaged by the inner end of the coupling member whereby the end of the coupling member will force the wedge-shaped head between the body shoulder and the tubing when the coupling member is drawn tight.

JOHN T. MARVIN.